United States Patent
Bell et al.

(10) Patent No.: US 10,669,108 B2
(45) Date of Patent: Jun. 2, 2020

(54) BOOM CONVEYOR

(71) Applicant: SOVEX LTD, Prenton (GB)

(72) Inventors: Bryan Anthony Bell, Mold Flintshire (GB); John Henderson, Tranmere Merseyside (GB)

(73) Assignee: TRANSNORM SYSTEM GMBH, Harsum (DE)

(*) Notice: Subject to any disclaimer, the term of this patent is extended or adjusted under 35 U.S.C. 154(b) by 0 days.

(21) Appl. No.: 16/314,977

(22) PCT Filed: May 23, 2017

(86) PCT No.: PCT/GB2017/051432
§ 371 (c)(1),
(2) Date: Jan. 3, 2019

(87) PCT Pub. No.: WO2018/007781
PCT Pub. Date: Jan. 11, 2018

(65) Prior Publication Data
US 2019/0308829 A1    Oct. 10, 2019

(30) Foreign Application Priority Data
Jul. 8, 2016  (GB) .................................. 1611908.3

(51) Int. Cl.
*B65G 21/14*     (2006.01)
*B65G 15/26*     (2006.01)
(Continued)

(52) U.S. Cl.
CPC .............. *B65G 67/08* (2013.01); *B64F 1/32* (2013.01); *B65G 15/26* (2013.01); *B65G 21/14* (2013.01)

(58) Field of Classification Search
None
See application file for complete search history.

(56) References Cited

U.S. PATENT DOCUMENTS 2,905,262 A * 9/1959 Zwight ................ B66F 17/006
                                                                182/2.8
3,937,340 A    2/1976 Grove
(Continued)

FOREIGN PATENT DOCUMENTS

CN    105 621 121 A    6/2016
DE    10 2008 036721 A1    2/2010
(Continued)

OTHER PUBLICATIONS

Search Report under Section 17 for GB1611908.3, dated Dec. 8, 2016, 1 page, GB.
(Continued)

*Primary Examiner* — Kavel Singh
(74) *Attorney, Agent, or Firm* — Alston & Bird LLP

(57) ABSTRACT

A boom conveyor apparatus includes a boom that carries a conveyor, a support structure for the boom, a rear pivot joint that connects a rear end of the boom to the support structure, and a pivot drive that controls pivoting movement of the boom about the rear pivot joint. The boom conveyor apparatus includes an operator platform and an attachment mechanism at a front end of the boom whereby the operator platform may be attached to the boom or detached therefrom. The attachment mechanism includes a levelling mechanism that is configured to apply a levelling adjustment to the operator platform.

24 Claims, 11 Drawing Sheets

(51) Int. Cl.
  *B65G 41/00* (2006.01)
  *B65G 67/08* (2006.01)
  *B64F 1/32* (2006.01)

(56) References Cited

U.S. PATENT DOCUMENTS

| | | | |
|---|---|---|---|
| 5,351,809 A | 10/1994 | Gilmore et al. | |
| 5,727,645 A | 3/1998 | Woodling | |
| 6,484,862 B1 * | 11/2002 | Gilmore | B65G 21/14 |
| | | | 193/35 TE |
| 8,443,936 B1 | 5/2013 | Raymond | |
| 2002/0144862 A1 * | 10/2002 | Engvall | B66F 11/046 |
| | | | 182/18 |
| 2006/0070845 A1 | 4/2006 | Crookston | |

FOREIGN PATENT DOCUMENTS

| | | | |
|---|---|---|---|
| EP | 2 221 271 A2 | 8/2010 | |
| EP | 2 952 457 A1 | 12/2015 | |
| GB | 2484546 | 4/2012 | |
| GB | 2 537 669 A | 10/2016 | |

OTHER PUBLICATIONS

International Search Report, dated Aug. 9, 2017, 2 pages, EPO, Rijswijk, The Netherlands.
Written Opinion of the International Searching Authority dated Aug. 9, 2017 for International application No. PCT/GB2017/051432.
International Preliminary Report on Patentability dated Jan. 8, 2019 for International application No. PCT/GB2017/051432.
Office Action for British Application No. 1611908.3, dated Dec. 6, 2019, 5 pages.
Examination Report for British Application No. 1611908.3, dated Feb. 28, 2020, 4 pages.
Office Action for Chinese Application No. 201780042364.8, dated Mar. 23, 2020, 19 pages.

* cited by examiner

BOOM CONVEYOR

FIELD

The present invention relates to a boom conveyor for loading and unloading pallets and containers. In particular but not exclusively it relates to a telescopic boom conveyor for use with unit load devices (ULDs), also known as "air cans", which are used for transporting goods by air. These may be up to 3 metres tall and may contain a variety of goods.

BACKGROUND

Upon arrival at a distribution centre, the goods are unloaded via the boom from the ULDs and sorted for delivery to customers/retailers. The ULDs are then reloaded via the boom with other goods for transportation.

The goods are generally loaded and unloaded using a pivoting telescopic boom conveyor that can be extended telescopically and raised/lowered as required. Goods from the ULD are transferred by hand onto the boom conveyor, which then conveys the goods into the distribution centre via either a travelling conveyor belt or a set of rotating rollers.

The telescopic boom conveyor usually has a control panel at its free end, containing controls that allow an operator to control various functions of the conveyor, for example the height and extension of the conveyor, the direction of conveying operation (loading or unloading), and stopping/starting the conveyor. The controls are positioned so that they are accessible to the operator.

In order to transfer goods to and from the boom conveyor, it may be necessary for the operator to stand on a step ladder or platform. However, this is not an ideal solution as it may not be possible for the operator to adjust the height of the stepladder or platform as the height of the boom changes. Also, the use of a stepladder may give rise to safety risks.

It is known to attach an operator platform rigidly to the end of a boom conveyor, allowing an operator to stand at the correct height. This solution is satisfactory when the boom pivots through only a small angle, for example less than 5°. However, if the boom pivots through a larger angle, the floor of the platform may tilt excessively making the operator platform unstable and dangerous to use. This problem is most likely to occur if the boom is relatively short, for example less than 10 metres in length when fully extended, and is adjustable through a wide range of pivot angles.

It is also known to provide a self-levelling operator platform on an extending boom. Such an apparatus is described for example in EP2952457A1. However, the self-levelling mechanism is complex, including a pivot joint attached to an upper part of the platform and a linear actuator that is connected to a lower part of the platform. Devising a self-levelling mechanism that is simple and reliable and suitable for use on a pivoting boom conveyor is difficult.

Although it is generally desirable to provide an operator platform at the end of the conveyor, there may be occasions when it is preferable to use the conveyor without a platform. For example, if the conveyor is used to load or unload goods near to ground level it may be easier for an operator to stand on the ground so that his or her movement is not restricted by the dimensions of the platform. Therefore, it may be preferable for the platform to be removable. In this case, it is important that the operator platform can be attached and detached quickly and easily, preferably without requiring the use of tools. It is also important for safety reasons to ensure that the platform is securely and correctly attached to the conveyor before the conveyor is raised to an elevated working position.

Finally, it is important that the operator platform allows unobstructed access to the operating controls provided at the end of the conveyor.

SUMMARY

It is an object of the present invention to provide a boom conveyor apparatus that mitigates one or more problems associated with known boom conveyors, as set out above, or that provides a useful alternative thereto.

According to an embodiment of the invention there is provided a boom conveyor apparatus including a boom that carries a conveyor, a support structure for the boom, a rear pivot joint that connects a rear end of the boom to the support structure, a pivot drive that controls pivoting movement of the boom about the rear pivot joint, an operator platform, and an attachment mechanism at a front end of the boom whereby the operator platform may be attached to the boom or detached therefrom, wherein the attachment mechanism includes a levelling mechanism that is configured to apply a levelling adjustment to the operator platform.

In an embodiment, the invention provides an operator platform attached to the boom, which aids loading and unloading of goods to and from the conveyor. The levelling mechanism ensures that the platform is always level, independent of the pivot angle of the boom, ensuring operator comfort and safety. The operator platform is also detachable from the boom, allowing use of the boom without the operator platform, when this is desired.

The mechanism is very simple and reliable and does not interfere with operation of the boom. It allows an operator to stand at the correct height relative to the front end of the boom for safe and efficient loading and unloading operations, and avoids the risks associated with the use of step ladders and separate platforms.

In an embodiment, the attachment mechanism includes an attachment element that is rigidly attachable to the operator platform, and wherein the levelling mechanism includes a pivot mechanism that enables rotation of the attachment element relative to the boom about a pivot axis, and a levelling actuator that controls rotation of the attachment element about the pivot axis. The attachment element allows the operator platform to be attached to the end of the boom or detached from the boom when the platform is not required. The levelling actuator controls rotation of the attachment element about the pivot axis, thus providing a levelling action. This arrangement provides a levelling operation and requires only a single connection between the boom and the operator platform, through the attachment element. Attaching and detaching the operator platform can therefore be quickly and easily carried out.

In an embodiment, the attachment mechanism includes an attachment element that is rigidly attachable to the operator platform, and the attachment element is configured for movement between a connect configuration and a disconnect configuration.

In an embodiment, the attachment element is configured for movement between a connect configuration and a disconnect configuration. In an embodiment, the attachment element is configured for movement in a direction parallel to the pivot axis between the connect configuration and the disconnect configuration. In an embodiment, the attachment mechanism includes a connection actuator configured to drive movement of the attachment element between the connect configuration and a disconnect configuration. Attaching and detaching the operator platform can therefore be quickly and easily carried out, simply by moving the attachment element between the connect configuration and a disconnect configuration, for example by actuating the connection actuator.

In an embodiment, the attachment element includes a pivot arm that is pivotable relative to the boom about the pivot axis and a plurality of connection elements mounted on the pivot arm that are engageable with complementary connection elements on the operator platform. In an embodiment, the levelling actuator is connected to the pivot arm.

In an embodiment, the attachment element carries a plurality of electrical connectors that can be connected to complementary electrical connectors on the operator platform, for transmitting electrical power or electrical signals to or from the operator platform. The connectors can be used to transmit electrical power and/or control/sensor signals between the boom and the operator platform.

In an embodiment, the pivot drive is configured to be inoperable if the electrical connectors are not connected, thus preventing operation of the boom when the operator platform is not attached, or is not correctly attached.

In an embodiment, the attachment mechanism includes a pair of attachment elements, for example connection pins, for attachment to the operator platform at laterally spaced-apart locations.

In an embodiment, the levelling mechanism includes a level sensor that is configured to control operation of the levelling mechanism. The levelling sensor may for example be provided on a component of the attachment mechanism or on the operator platform. Alternatively, levelling may be controlled according to the pivot angle of the boom (which may for example be sensed directly or determined from control signals sent to the pivot drive).

The boom conveyor may include a rear boom section that is connected by the rear pivot joint to the support structure, and a front boom section that is connected by the front pivot joint to the operator platform, wherein the front and rear boom sections are telescopically adjustable to adjust the length of the boom conveyor.

Optionally, the boom conveyor is pivotable through an angle of at least 10°, preferably at least 15°, more preferably at least 20°. The invention is particularly well suited to shorter booms, for example a length in the range 3 to 10 metres, which require a relatively large range of pivoting movement in order to provide an adequate range of operating heights.

The conveyor optionally comprises a conveyor belt that runs over an upper surface of the boom, or a plurality of conveyor rollers on an upper surface of the boom.

In an embodiment the operator platform comprises a base and fence that is attached to the base, which serves as a safety rail to prevent an operator falling from the platform.

According to another embodiment of the invention there is provided a boom conveyor apparatus including a boom that carries a conveyor, a support structure for the boom, a rear pivot joint that connects a rear end of the boom to the support structure, a pivot drive that controls pivoting movement of the boom about the rear pivot joint, an operator platform, an attachment mechanism at a front end of the boom whereby the operator platform may be attached to the boom or detached therefrom, wherein the attachment mechanism includes a levelling mechanism that is configured to apply a levelling adjustment to the operator platform, and wherein the attachment mechanism includes an attachment element that is rigidly attachable to the operator platform, and the attachment element is configured for movement between a connect configuration and a disconnect configuration.

BRIEF DESCRIPTION OF THE DRAWINGS

An embodiment of the invention will now be described by a way of example with reference to the accompanying drawings, in which:

FIGS. 1 to 3 of the drawings illustrate a loading apparatus 2, which in this embodiment is designed for loading and unloading goods to and from a conventional unit load device 3. The loading apparatus may alternatively be designed for loading and unloading goods to and from a road vehicle, a rail truck, an aircraft or any other goods container.

DETAILED DESCRIPTION

Figure 1:
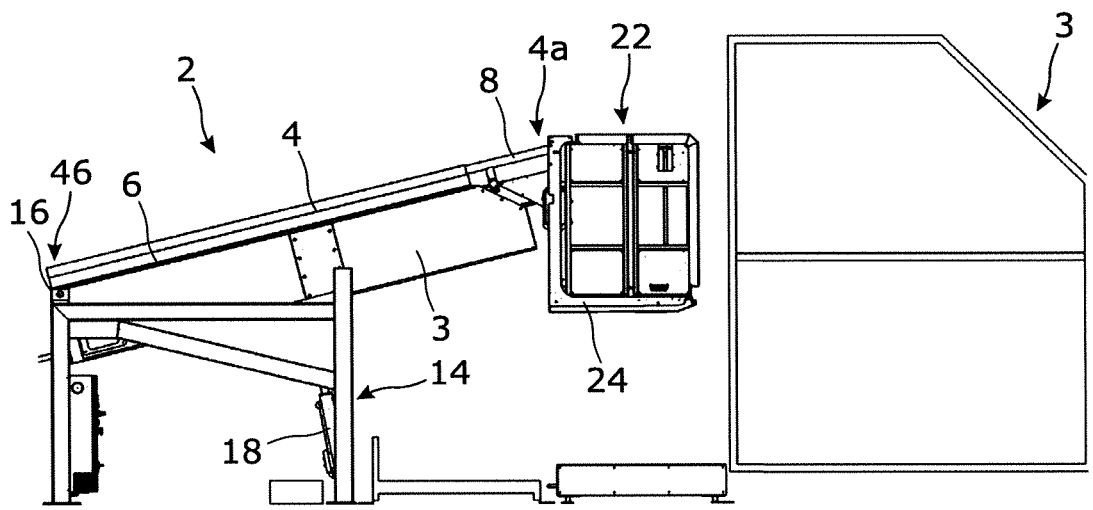
FIG. 1 is a side view of a boom conveyor in a fully raised configuration, with a unit load device.

The loading apparatus 2 includes a boom conveyor 3, which in this embodiment comprises a telescopic boom 4 having a rear boom section 6 and a front boom section 8 that is telescopically extendable relative to the rear section 6 so as to adjust the overall length of the boom conveyor 4. Typically, the boom conveyor 3 has a maximum length when fully extended of about 5.5 metres and a minimum length when fully contracted of about 3 metres. However, these dimensions are not intended to be limiting; in certain applications the boom conveyor may have a length when fully extended of 15 metres or more. The invention is also applicable to fixed length (non-telescopic) boom conveyors.

The boom conveyor 3 carries a conveyor mechanism 9, which in this embodiment comprises a conveyor belt 10 that passes around rollers (not shown) at the front and rear ends the boom. The conveyor belt 10 includes a conveying portion that runs along the upper surface of the boom 4 and a return portion (not shown) that extends through the interior of the boom 4. In the case of a telescopic boom, the return portion (not shown) will also pass around a tensioning mechanism (not shown) that takes up any slack in the belt 10 as the telescopic boom 4 contracts and extends and maintains a constant tension in the belt 10. In this embodiment the conveyor mechanism 9 also comprises a plurality of freely rotating conveyor rollers 12, which are optionally provided at the front end 4a of the boom, beyond the end of the belt 10. Side walls 13 are provided to prevent goods from falling off the conveyor belt 4.

Alternatively, instead of a conveyor belt 10, the conveyor mechanism 9 may comprise a plurality of conveyor rollers that can be either freely rotating or driven to convey goods along the boom conveyor 3 for loading and unloading operations.

The boom conveyor 3 may also include drive mechanisms (not shown) for adjusting the length of the boom 4 and for driving the conveyor belt 10 forwards or backwards to convey goods along the boom during loading and unloading operations. The aforesaid tensioning mechanism and the drive mechanisms, as well as the support structure for supporting the telescopically extending front boom section 8 relative to the rear boom section 6 are all conventional and so will not be described in detail. They may however be similar to the structures and mechanisms described in GB2484546A or U.S. Pat. No. 5,351,809, for example. Also, the optional provision of conveyor rollers is conventional and so will not be described in detail.

The boom conveyor 3 is supported by a support structure 14. The boom conveyor 3 is pivotably attached to the support structure 14 by a rear pivot joint 16, which is located at the rear end 4b of the boom 4, close to the upper surface of the boom.

The boom conveyor 3 is supported for pivoting movement about the rear pivot joint 16 by a pivot drive 18, which in this embodiment comprises a hydraulic ram that is pivotably attached at its lower end to the support structure 14, and at its upper end to a pivot joint 20 located on the underside of the boom 4. The hydraulic ram 18 controls pivoting movement of the boom 4 about the rear pivot joint 16 to adjust the height of the front end 4a of the boom above the ground. Other types of pivot drive for controlling pivoting movement of the boom 4 can also be used of course.

An operator platform 22 for a human operator is attached to the front end 4a of the boom 4. The operator platform 32 includes an L-shaped support frame 24, a base 26 and a fence 28 that extends around the rear and side edges of the base 26. In this embodiment, the side portions 30 of the fence 28 are configured to pivot between an extended (or closed) configuration as depicted in FIGS. 1-5 and 10 in which they close off the sides of the operator platform 22, and a folded (or open) configuration (not illustrated) in which they are folded back against the rear portion 32 of the fence 28, to allow access to the sides of the operator platform 22. In this embodiment, the front side of the operator platform 22 is open to allow operators free access to goods in the unit load device 3. Alternatively, the fence 28 may extend across the front of the operator platform 22.

Various operational functions of the boom conveyor 3, including for example raising and lowering of the boom 4, telescopic extension and contraction of the boom 4, selecting the conveying direction and speed of the conveyor mechanism 9, and turning the conveyor drive mechanism on and off, may be controlled from a control panel 34 that is provided at the front end 4a of the boom. The operator platform 22 is preferably configured to allow operators to access the control panel 34, allowing them to control the operational functions of the boom conveyor 3.

Figure 2:
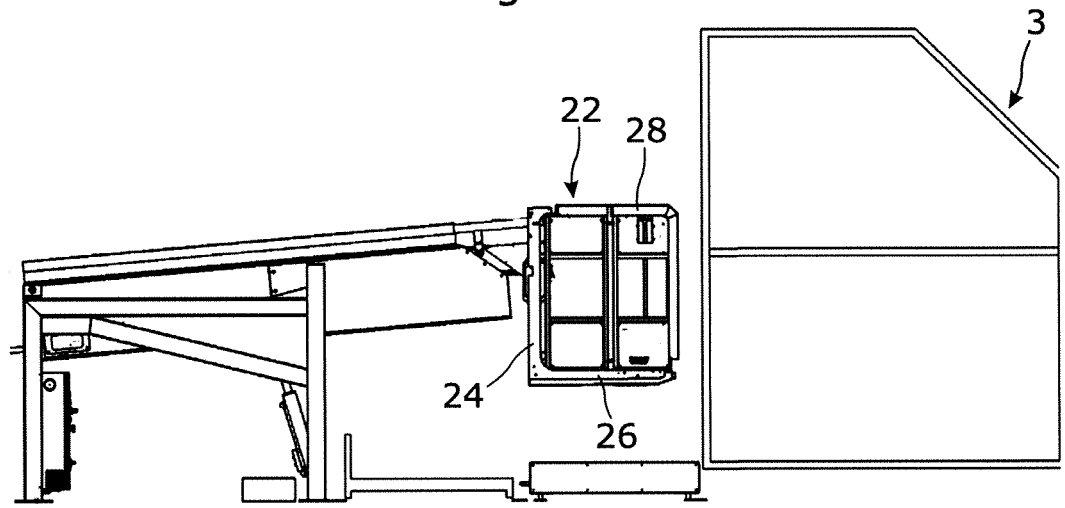
FIG. 2 is a side view of a boom conveyor in a partially raised configuration, with a unit load device.
Figure 3:
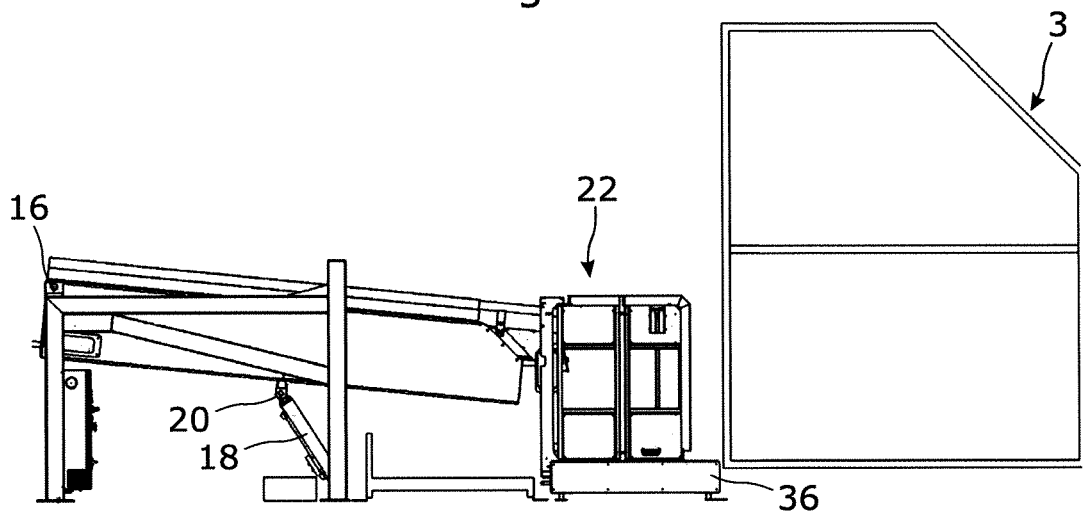
FIG. 3 is a side view of a boom conveyor in a fully lowered configuration, with a unit load device.
Figure 4:
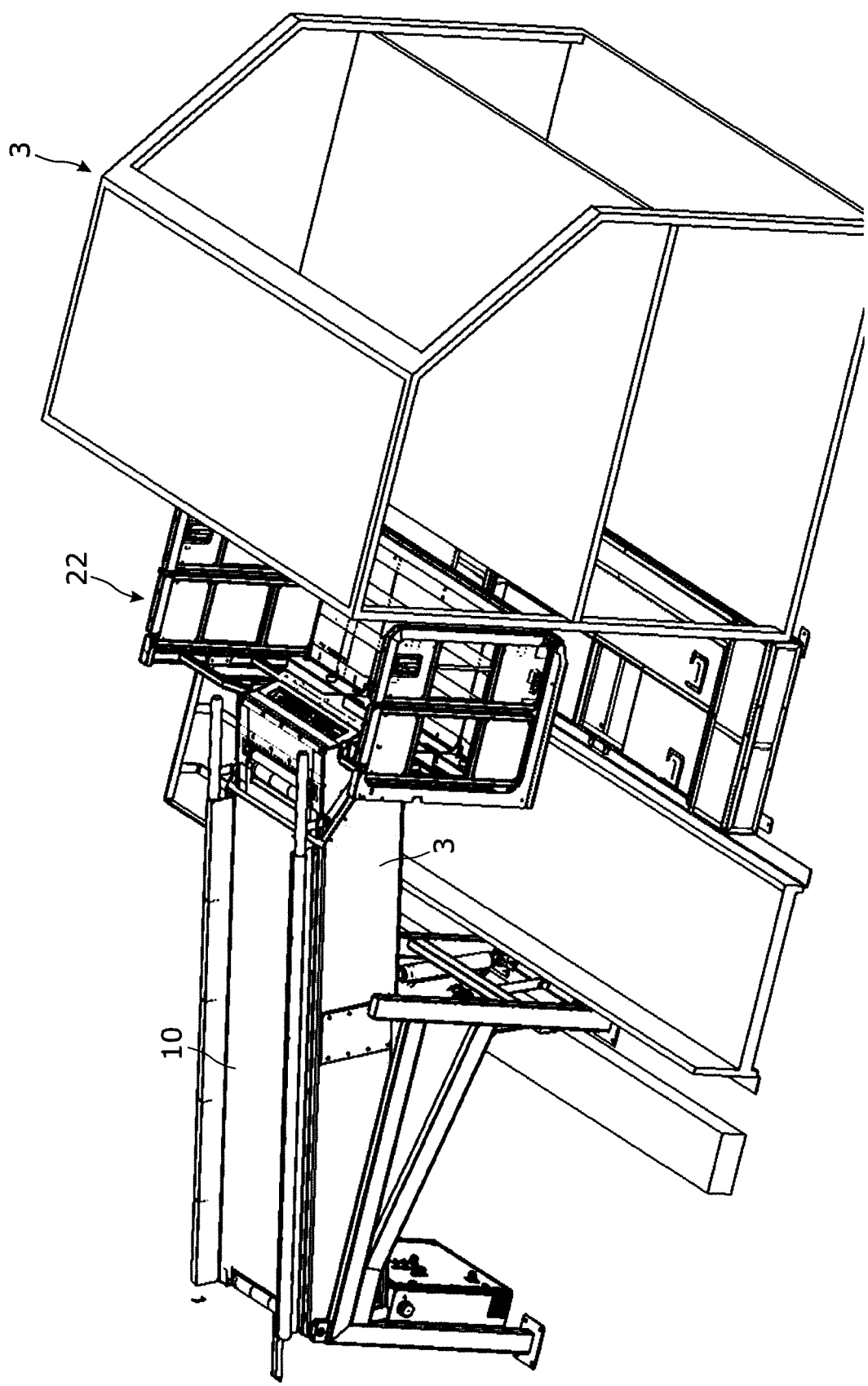
FIG. 4 is an isometric view of a boom conveyor in a fully raised configuration, with a unit load device.
Figure 5:
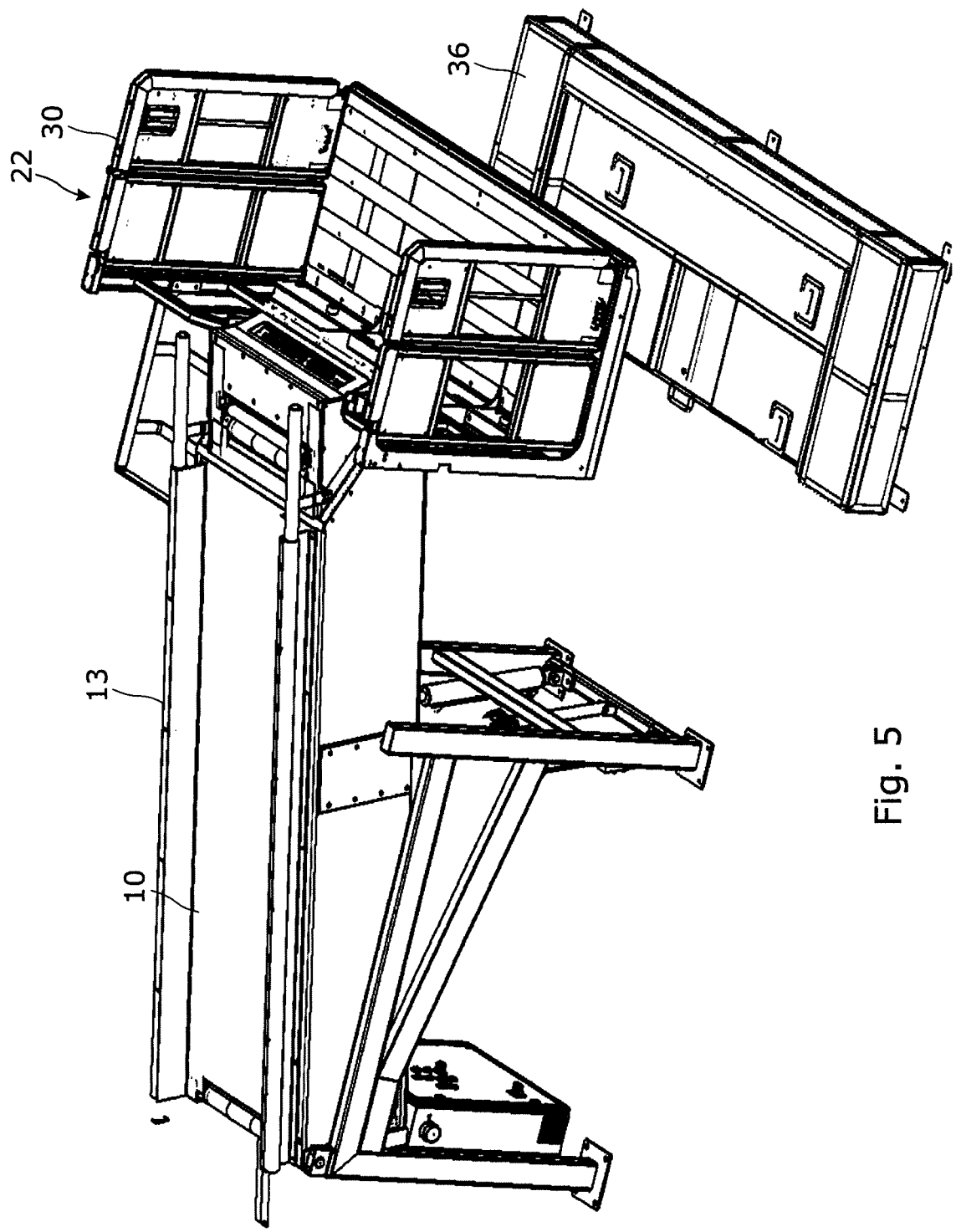
FIG. 5 is an isometric view of a boom conveyor in a fully raised configuration, without a unit load device.
Figure 6:
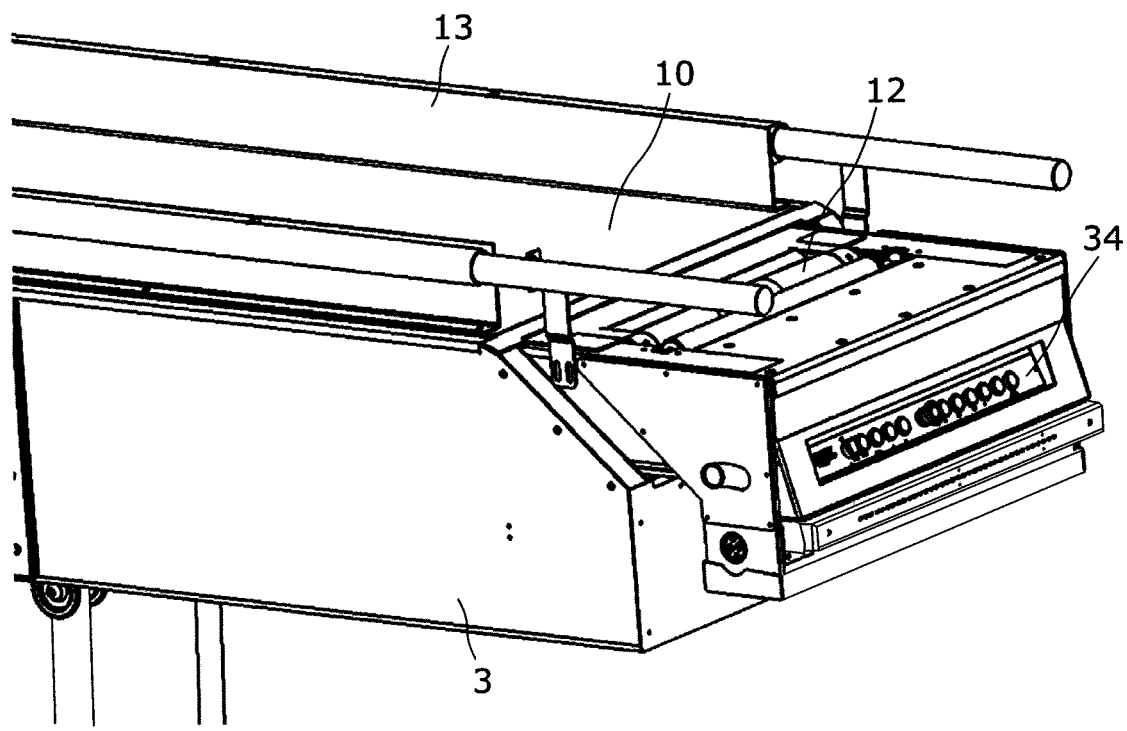
FIG. 6 is an isometric view showing an end part of a boom conveyor without an operator platform.
Figure 7:
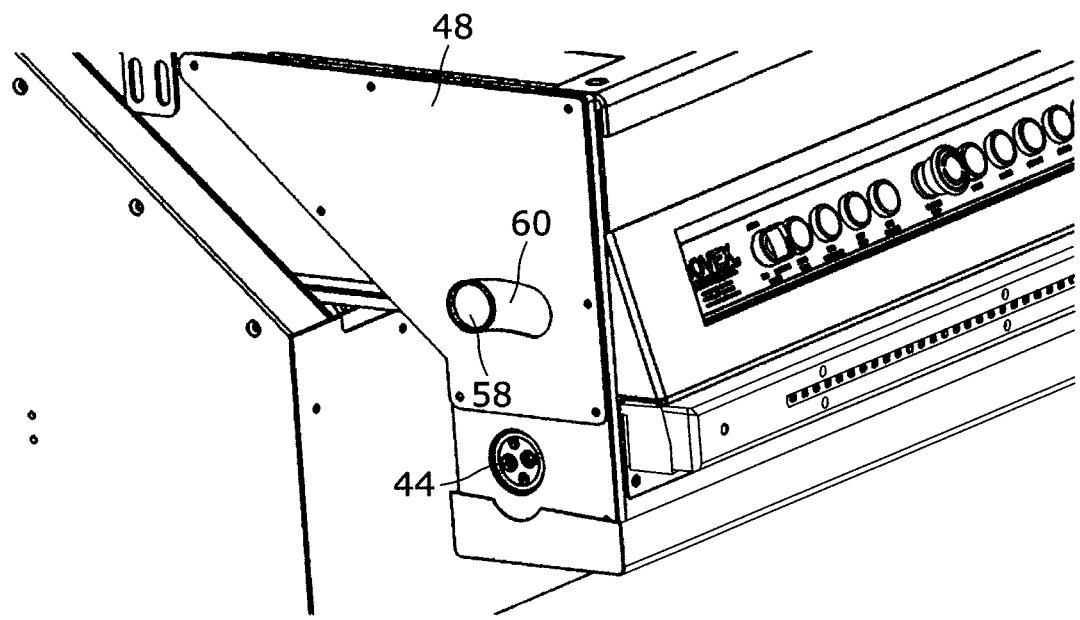
FIG. 7 is an isometric view at an enlarged scale, showing an end part of a boom conveyor without an operator platform.
Figure 8:
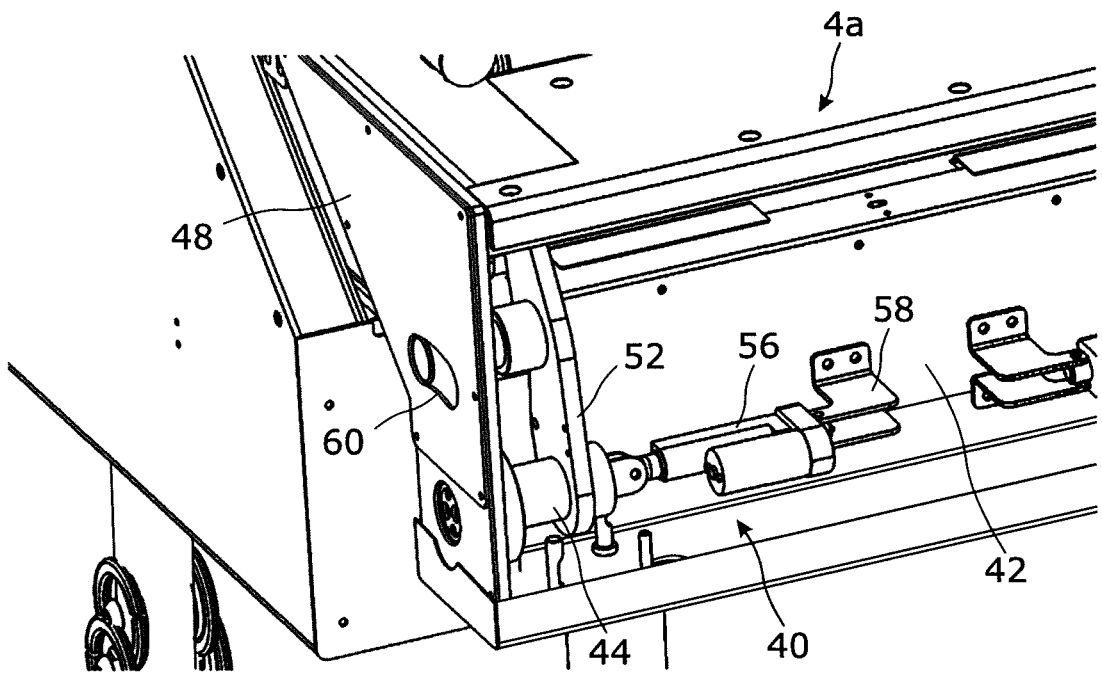
FIG. 8 is an isometric view at an enlarged scale from the front left, showing an end part of a boom conveyor without an operator platform.
Figure 9:
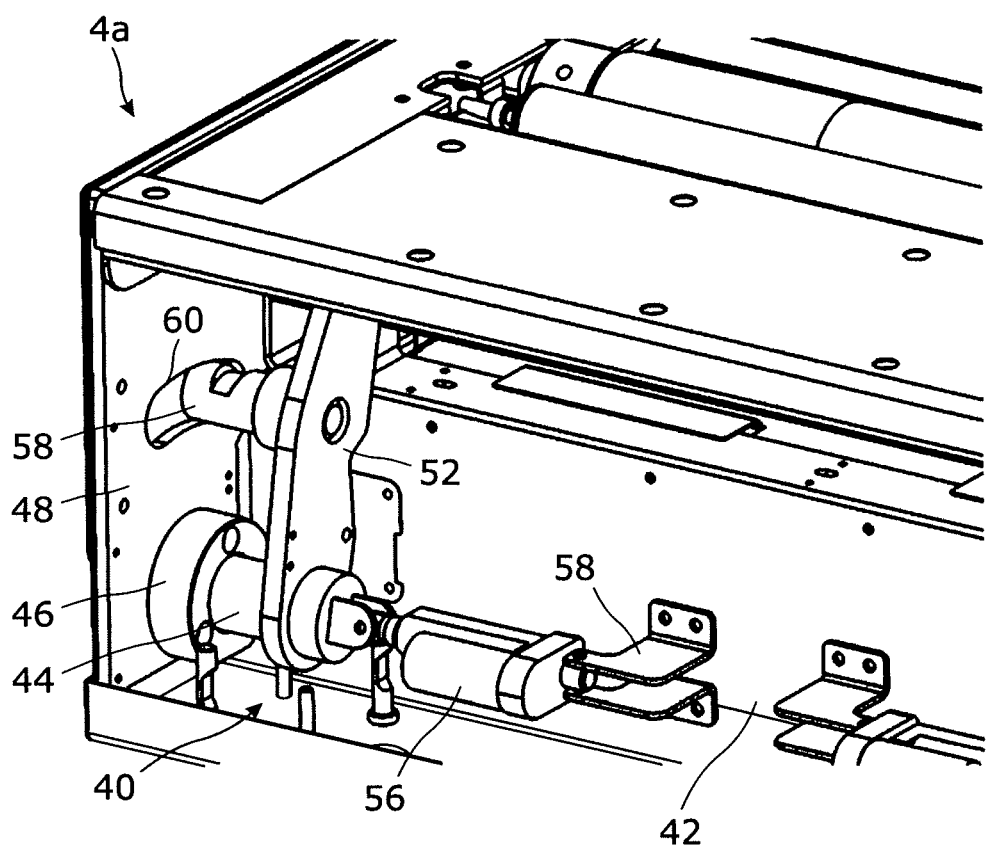
FIG. 9 is an isometric view at an enlarged scale from the front right, showing an end part of a boom conveyor without an operator platform.

The hydraulic ram 18 can be extended or contracted to raise or lower the front end 4a of the boom 4. For example, in FIG. 1 the boom 4 is shown in a fully raised position in which the base of the operator platform 22 is lifted to a height of about 2.3 metres above the ground. In FIG. 2 the boom 4 is shown in a partially raised position, and in FIG. 3 it is shown in a fully lowered position, in which the base of the operator platform 22 is located on a docking station 36 at a height of about 0.5 metres above the ground. The docking station 36 may comprise part of a walkway, allowing operators to walk between different boom conveyors. When the operator platform 22 is located on a docking station 36, the side portions 30 of the fence 28 may be positioned in the folded (or open) configuration (not illustrated) to allow operators to walk across the operator platform 22.

In this embodiment the boom conveyor 4 pivots through an angle of about 20° between the fully raised and fully lowered positions. These dimensions are not intended to be limiting: in other embodiments the boom conveyor 4 may be arranged to pivot through a greater or lesser range of angles.

The operator platform 22 is attached to the front end 4a of the boom 4 by an attachment and levelling mechanism 40, which is shown most clearly in FIGS. 8, 9 and 12-19. The attachment and levelling mechanism 40 connects the upright part of the L-shaped support frame 24 to a platform support structure 42, for example a transverse support beam, that is provided at the front end of the boom 4. The attachment and levelling mechanism 40 is configured to provide controlled rotation of the operator platform 22 about a horizontal pivot axis P, so as to maintain the base 26 of the operator platform in a level, horizontal position as the boom 4 is raised or lowered.

In the present embodiment, two equivalent attachment and levelling mechanisms 40 are provided, which are located on opposite sides of the boom 4. Each attachment and levelling mechanism 40 includes a pivot pin 44 that is mounted in a bearing 46 attached to a side plate 48 at the front end 4a of the boom 4. The bearing 46 is configured to allow both rotational and axial movement of the pivot pin 44 relative to a pivot axis P that extends substantially transverse to the length of the boom 4. The pivot pin 44 is able to move axially between a disconnect configuration as shown for example in FIGS. 8, 9, 13 and 14 in which the outer end of the pin is located flush with or inwards of the outer surface of the side plate 48, and a connect configuration as shown for example in FIG. 15 in which the outer end of the pin 44 extends outwards beyond the outer surface of the side plate 48.

Figure 12A:
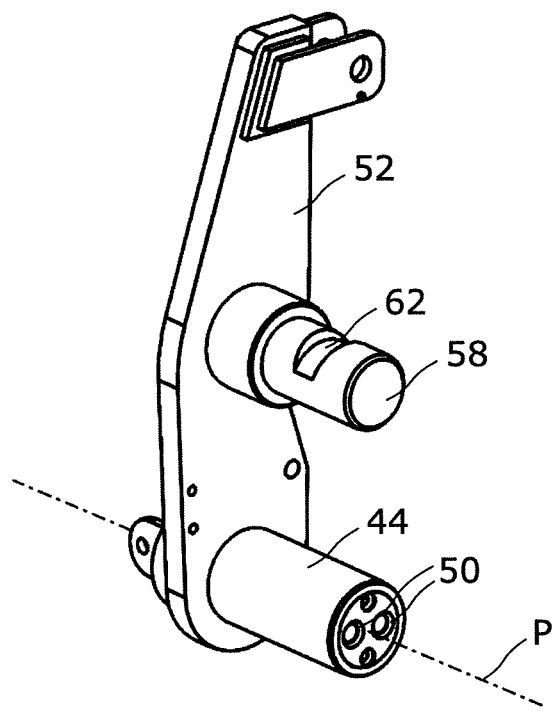
FIG. 12a is an isometric view from the front right, showing part of an attachment mechanism for attaching an operator platform to a boom conveyor.
Figure 12B:
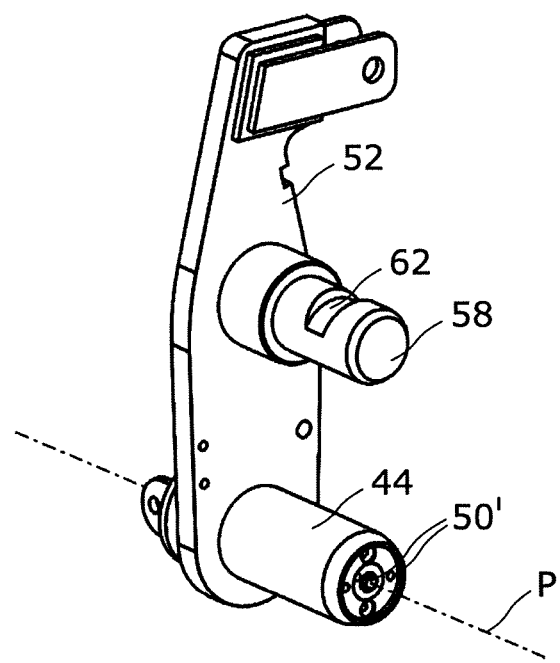
FIG. 12b is an isometric view from the front right, showing part of an attachment mechanism for attaching an operator platform to a boom conveyor, having a modified electrical connector.
Figure 13:
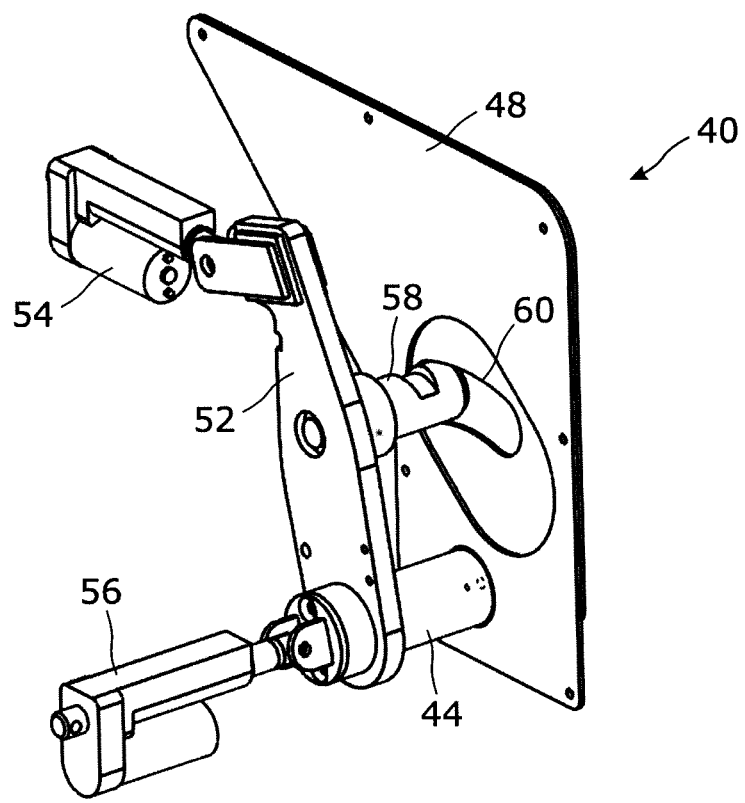
FIG. 13 is an isometric view from the front left, showing part of an attachment and levelling mechanism for attaching an operator platform to a boom conveyor, in a disconnect configuration.
Figure 14:
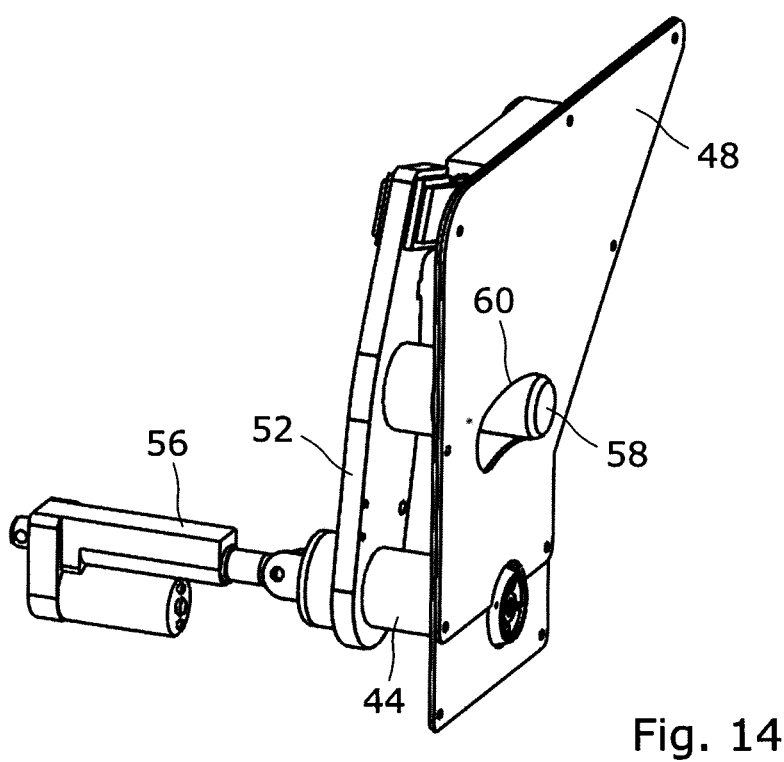
FIG. 14 is an isometric view from the front right, showing part of an attachment and levelling mechanism in a disconnect configuration.
Figure 15:
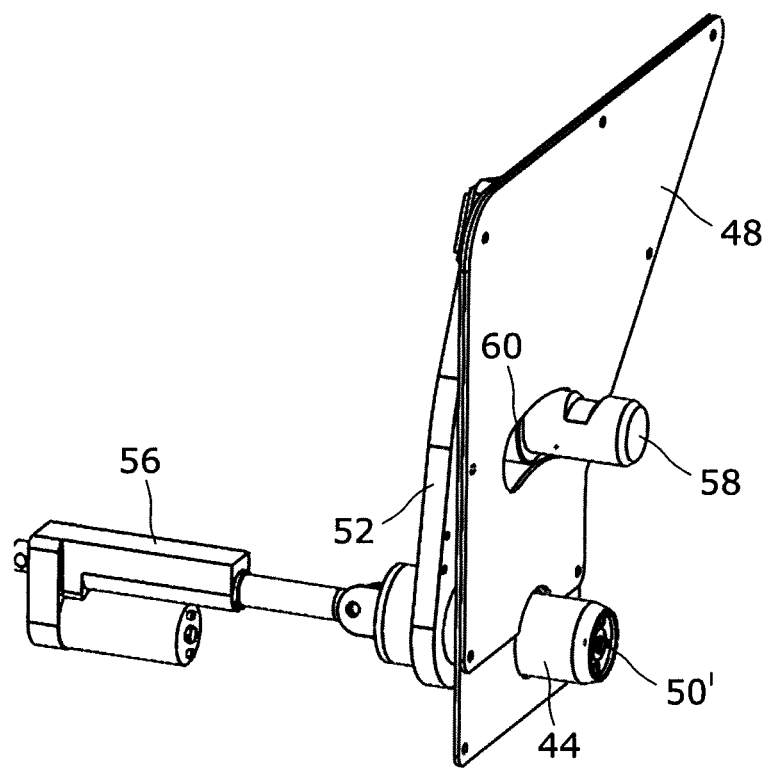
FIG. 15 is an isometric view from the front right, showing part of an attachment and levelling mechanism in a connect configuration.
Figure 16:
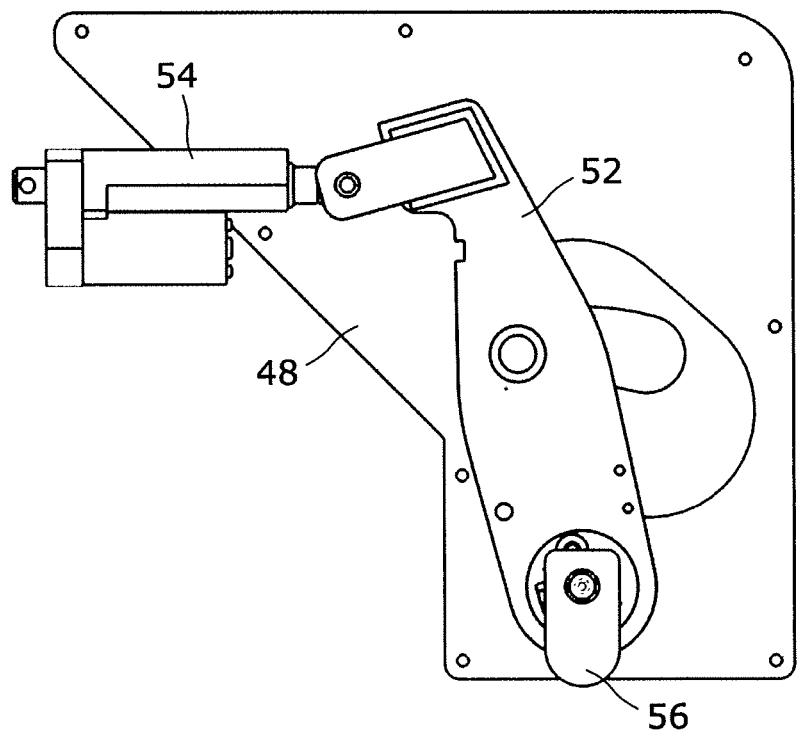
FIG. 16 is an internal left side view, showing part of an attachment and levelling mechanism with the conveyor in a fully lowered configuration.
Figure 17:
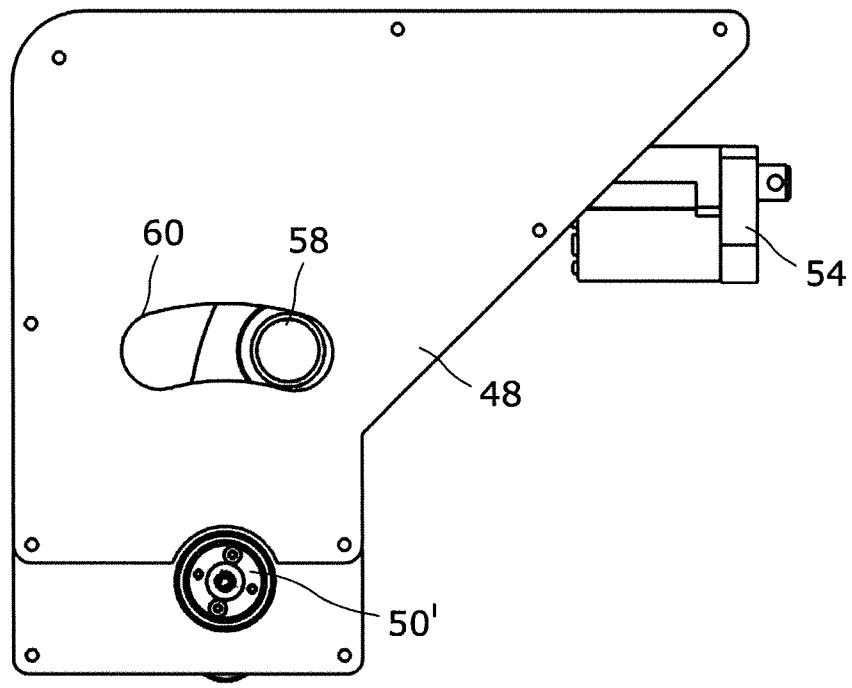
FIG. 17 is an external right side view, showing part of an attachment and levelling mechanism with the conveyor in a fully lowered configuration.
Figure 19:
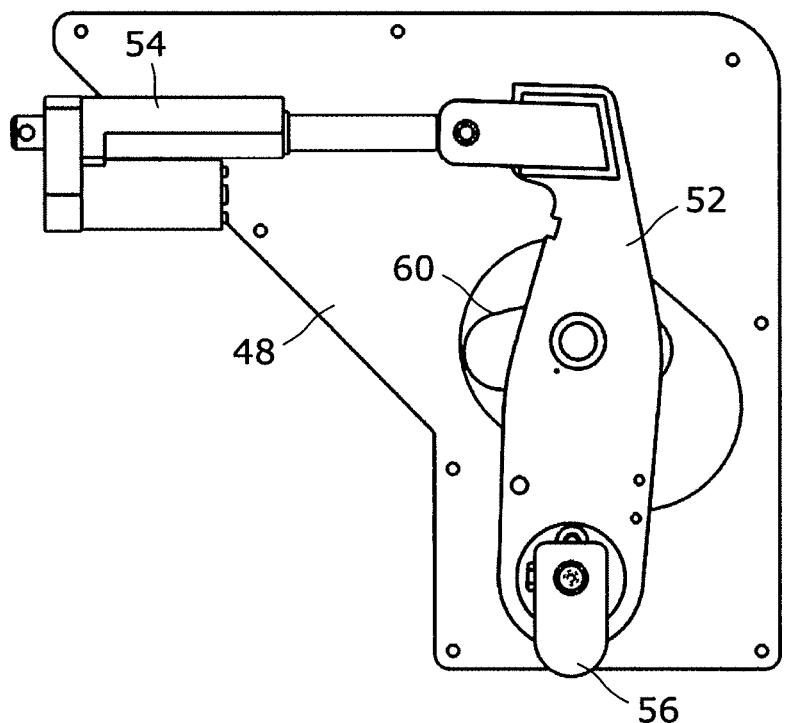
FIG. 19 is an internal left side view, showing part of an attachment and levelling mechanism with the conveyor in a fully raised configuration.
Figure 18:
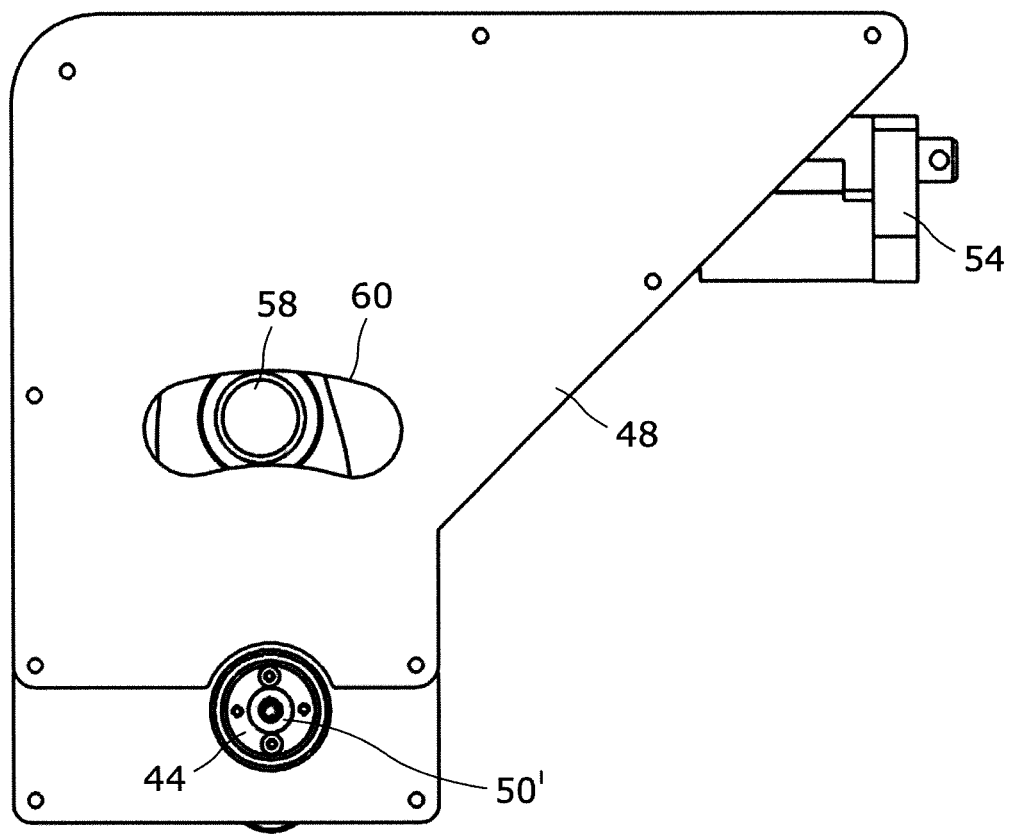
FIG. 18 is an external right side view, showing part of an attachment and levelling mechanism with the conveyor in a fully raised configuration.

As shown in FIG. 12a, the pivot pin 44 carries at its outer end a number of axially-engageable electrical connectors 50, in this embodiment comprising two connectors 50 that are located on either side of the pivot axis P. Alternatively, as shown in FIG. 12b, the electrical connectors 50' may comprise a central connector and a concentric ring connector, which ensures correct electrical connection regardless of the orientation of the pin 44.

A pivot arm 52 is attached at its lower end to the pivot pin 44, for axial and radial movement with the pivot pin. An upper end of the pivot arm 52 is attached to a levelling actuator 54, for example a hydraulic ram or an electrical linear actuator, which is also attached to the support structure of the boom 4. The levelling actuator 54 can be activated to control pivoting movement of the pivot arm about the pivot axis P.

The pivot pin 44 is connected to a connection actuator 56, for example a hydraulic ram or an electrical linear actuator, which is also attached to the platform support structure 42 through a bracket 58. The connection actuator 56 can be activated to control axial movement of the pivot pin 44 in the direction of the pivot axis P between the connect and disconnect configurations.

A platform support pin 58 is attached to the pivot arm 52 between its upper and lower ends. The platform support pin 58 extends outwards from the arm 52 through an arcuate slot 60 in the side plate 48. The platform support pin 58 is configured for axial and radial movement with the pivot pin 44. The platform support pin 58 is able to move axially between a disconnect configuration as shown for example in FIGS. 8, 9, 13 and 14 in which the outer end of the pin is located flush with or inwards of the outer surface of the side plate 48, and a connect configuration as shown for example in FIG. 15 in which the outer end of the pin 58 extends outwards beyond the outer surface of the side plate 48. The platform support pin 58 is provided with a locking formation 62, for example a slot in its upper surface.

Figure 10:
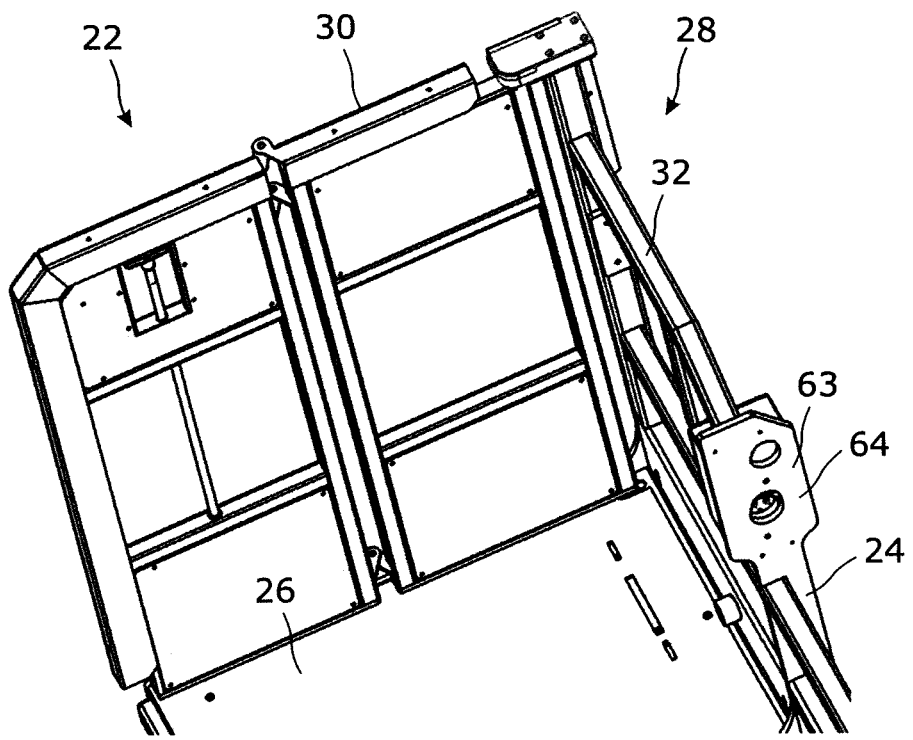
FIG. 10 is an isometric view showing part of an operator platform for a boom conveyor.
Figure 11:
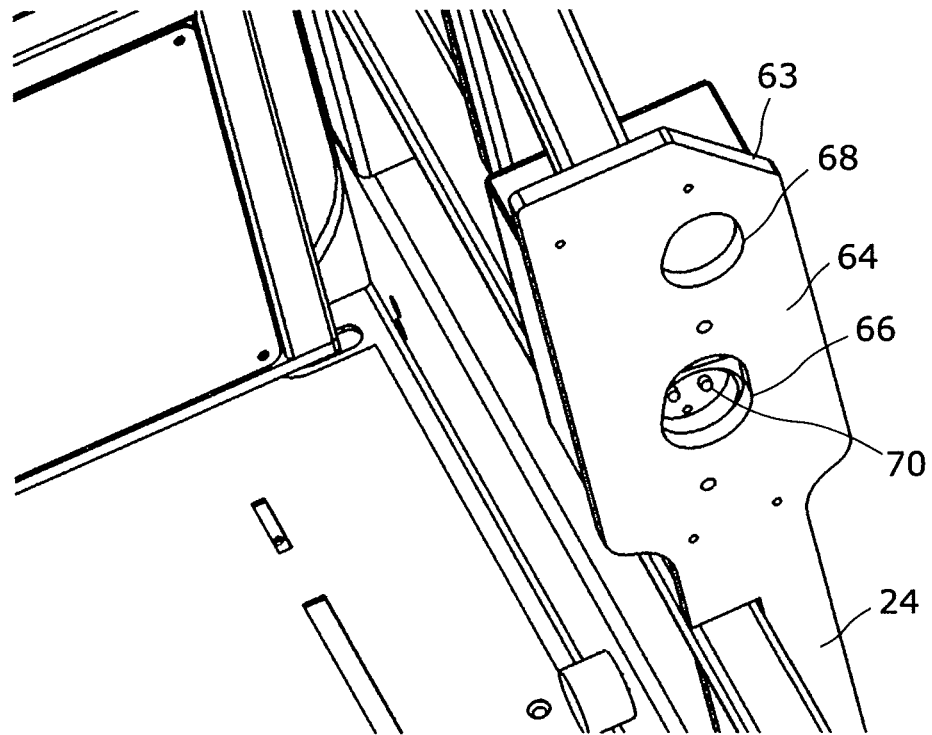
FIG. 11 is an isometric view at an enlarged scale showing part of an operator platform for a boom conveyor.

The support frame 24 of the operator platform 22 includes at its upper end a connection structure 63, which is shown most clearly in FIGS. 10 and 11, for attaching the operator platform 22 to the attachment and levelling mechanism 40. In the present embodiment, two equivalent connection structures 63 are provided, which are spaced apart for engagement with the two attachment and levelling mechanisms 40.

Each connection structure 63 includes a substantially vertical plate 64 which carries a pivot socket 66 for engagement with the pivot pin 44, and a support socket 68 for engagement with the platform support pin 58. The pivot socket 66 carries a number of axially-engageable electrical connectors 70, which are configured for electrical connection with the electrical connectors 50, 50' of the attachment and levelling mechanism 40.

The attachment and levelling mechanism 40 may be engaged with the connection structure 63 by aligning the pivot pin 44 and the platform support pin 58 with, respectively, the pivot socket 66 and the support socket 68, and then moving the pivot pin 44 and the platform support pin 58 axially outwards from the disconnect configuration to the connect configuration, so that the pins 44, 58 are brought into engagement with the sockets 66, 68. Axial movement of the pins 44, 58 is driven by the connection actuator 56. Subsequently, as the boom 4 is raised, the locking formation (or slot) 62 in the support pin 58 engages the edge of the support socket 68 to prevent disengagement of the support pin 58 while the weight of the platform 22 is carried by the boom. Bringing the pivot pin 44 into engagement with the pivot socket 66 also establishes an electrical connection between the boom electrical connectors 50, 50' and the platform electrical connectors 70.

In order to disengage the attachment and levelling mechanism 40 from the connection structure 63, the boom 4 must first be lowered so that the weight of the operator platform is carried entirely by the docking station 36. This allows the locking formation (slot) 62 in the support pin 58 to disengage the edge of the support socket 68. The pivot pin 44 and the platform support pin 58 may then be moved axially inwards from the connect configuration to the disconnect configuration, so that the pins 44, 58 are brought out if engagement with the sockets 66, 68. Axial movement of the pins 44, 58 is driven by the connection actuator 56. Disengaging the pivot pin 44 from the pivot socket 66 also breaks the electrical connection between the boom electrical connectors 50, 50' and the platform electrical connectors 70.

Orientation of the operator platform 22 relative to the boom 4 is adjusted by the levelling actuator 54, which controls pivoting movement of the pivot arm 52 about the pivot axis P, the operator platform 22 being rigidly attached to the pivot arm 52 through the engagement of the pins 44, 58 with the respective sockets 66, 68. Operation of the levelling actuator 54 is controlled by a levelling control system (not shown), which is configured to ensure that the base 28 of the operator platform 22 is maintained in a horizontal position, regardless of the extension or inclination of the boom 4.

The levelling control system (not shown) may for example include a level sensor mounted on the pivot arm 52, which senses the orientation of the arm and provides a control signal to the control system, which then responds by activating the levelling actuator to bring the base of the operator platform into a horizontal position. Alternatively, a level sensor may be provided on the operator platform. Control signals from the level sensor may then be transmitted to the control system for example through the electrical connectors 50, 50', 70 or wirelessly. Alternatively, the control system may be configured to set the orientation of the operator platform according to the angle of the boom, or control signals controlling the angle of the boom.

The electrical connectors 50, 50', 70 may also be used to transmit other signals from sensors mounted on the operator platform, for example for sensing a collision between the operator platform and an obstruction, or correct positioning of the operator platform on the docking station 36, or correct engagement of the attachment and levelling mechanism 40 with the connection structure 63, or any other required parameter. The electrical connectors 50, 50', 70 may also be used to transmit electrical power to any auxiliary devices carried by the operator platform, for example lights, audible alarms, power tools and so on. The control system may be configured to prevent operation of the boom conveyor unless signals indicating that the operator platform has been correctly attached to the boom have been detected. If the possibility of operating the boom conveyor 3 without the operator platform is required, the control panel 34 may be provided with an override control that permits such use.

Various modifications of the apparatus described above are of course possible. For example, if a fixed length boom is required the telescopic front and rear sections 8, 6 of the boom 4 can be omitted and replaced by a single non-adjustable boom.

The attachment mechanism may also take different forms, instead of the two pins described above and shown in the drawings. The attachment mechanism should however include one or more connection elements that are rigidly attachable to the operator platform or detachable therefrom, which allow the operator platform to be attached to the end of the boom and which control the position of the operator platform according to the levelling mechanism, ensuring that the platform is maintained in a level position at all times.

The invention claimed is:

1. A boom conveyor apparatus comprising:
    a boom that carries a conveyor;
    a support structure for the boom;
    a rear pivot joint that connects a rear end of the boom to the support structure;
    a pivot drive that controls pivoting movement of the boom about the rear pivot joint;
    an operator platform; and
    an attachment mechanism at a front end of the boom whereby the operator platform may be attached to the boom or detached therefrom, wherein the attachment mechanism comprises an attachment element configured to move between a connect configuration in which the attachment element engages the operator platform and a disconnect configuration in which the attachment element disengages the operator platform, and wherein the attachment mechanism includes a levelling mechanism that is configured to apply a levelling adjustment to the operator platform.

2. A boom conveyor apparatus according to claim 1, wherein the attachment element is rigidly attachable to the operator platform, and wherein the levelling mechanism includes a pivot mechanism that enables rotation of the attachment element relative to the boom about a pivot axis, and a levelling actuator that controls rotation of the attachment element about the pivot axis.

3. A boom conveyor apparatus according to claim 1, wherein the attachment element is configured for movement in a direction parallel to the pivot axis between the connect configuration and the disconnect configuration.

4. A boom conveyor apparatus according to claim 1, wherein the attachment mechanism includes a connection actuator configured to drive movement of the attachment element between the connect configuration and the disconnect configuration.

5. A boom conveyor apparatus according to claim 2, wherein the attachment element includes a pivot arm that is pivotable relative to the boom about the pivot axis and a plurality of connection elements mounted on the pivot arm that are engageable with complementary connection elements on the operator platform.

6. A boom conveyor apparatus according to claim 5, wherein the levelling actuator is connected to the pivot arm.

7. A boom conveyor apparatus according to claim 5, wherein the attachment element carries a plurality of electrical connectors that can be connected to complementary electrical connectors on the operator platform, for transmitting electrical power or electrical signals to or from the operator platform.

8. A boom conveyor apparatus according to claim 7, wherein the pivot drive is configured to be inoperable if the electrical connectors are not connected.

9. A boom conveyor apparatus according to claim 1, wherein the attachment element comprises a pair of attachment elements for attachment to the operator platform at laterally spaced-apart locations.

10. A boom conveyor apparatus according to claim 1, wherein the levelling mechanism includes a level sensor that is configured to control operation of the levelling mechanism.

11. A boom conveyor apparatus according to claim 1, wherein the boom conveyor includes a rear boom section that is connected by the rear pivot joint to the support structure, and a front boom section that is connected by the front pivot joint to the operator platform, wherein the front and rear boom sections are telescopically adjustable to adjust the length of the boom conveyor.

12. A boom conveyor apparatus according to claim 1, wherein the boom conveyor is pivotable through an angle of at least 10°, preferably at least 15°, more preferably at least 20°.

13. A boom conveyor apparatus according to claim 1, wherein the conveyor comprises a conveyor belt that runs over an upper surface of the boom, or a plurality of conveyor rollers on an upper surface of the boom.

14. A boom conveyor apparatus according to claim 1, wherein the operator platform comprises a base and fence that is attached to the base.

15. A boom conveyor apparatus according to claim 2, wherein the attachment mechanism includes a connection actuator configured to drive movement of the attachment element between the connect configuration and the disconnect configuration.

16. A boom conveyor apparatus according to claim 1, wherein the attachment element includes a pivot arm that is pivotable relative to the boom about the pivot axis and a plurality of connection elements mounted on the pivot arm that are engageable with complementary connection elements on the operator platform.

17. A boom conveyor apparatus according to claim 1, wherein the attachment element carries a plurality of electrical connectors that can be connected to complementary electrical connectors on the operator platform, for transmitting electrical power or electrical signals to or from the operator platform.

18. A boom conveyor apparatus according to claim 17, wherein the plurality of electrical connectors are configured to connect with complementary electrical connectors on the operator platform in an instance in which the attachment element is in the connect configuration.

19. A boom conveyor apparatus according to claim 18, wherein the plurality of electrical connectors are configured to preclude operation of the pivot drive in an instance in which the attachment element is in the disconnect configuration.

20. A boom conveyor apparatus according to claim 1, wherein the attachment mechanism comprises at least one side plate configured to, in the connect configuration, receive the attachment element.

21. A boom conveyor apparatus according to claim 20, wherein the attachment element further comprises a platform support pin configured to be received by the at least one side plate.

22. A boom conveyor apparatus according to claim 21, wherein the at least one side plate further defines an arcuate slot configured to, in the connect configuration, receive the platform support pin therein.

23. A boom conveyor apparatus according to claim 22, wherein, in the connect configuration, the platform support pin extends outwards beyond an outer surface of the side plate.

24. A boom conveyor apparatus according to claim 23, wherein, in the disconnect configuration, an outer end of the platform support pin is located inwards of the outer surface of the side plate.

* * * * *